United States Patent
Wu et al.

(10) Patent No.: US 10,966,111 B2
(45) Date of Patent: *Mar. 30, 2021

(54) COMMUNICATION METHOD, ACCESS POINT, AND STATION

(71) Applicant: HUAWEI TECHNOLOGIES CO., LTD., Guangdong (CN)

(72) Inventors: Ji Wu, Shanghai (CN); Yingpei Lin, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/724,985

(22) Filed: Dec. 23, 2019

(65) Prior Publication Data

US 2020/0128425 A1  Apr. 23, 2020

Related U.S. Application Data

(63) Continuation of application No. 16/039,083, filed on Jul. 18, 2018, now Pat. No. 10,536,872, and a
(Continued)

(30) Foreign Application Priority Data

Jan. 22, 2016 (CN) .......................... 201610042129.8

(51) Int. Cl.
*H04W 24/10* (2009.01)
*H04B 7/08* (2006.01)
(Continued)

(52) U.S. Cl.
CPC ............ *H04W 24/10* (2013.01); *H04B 7/061* (2013.01); *H04B 7/0695* (2013.01); *H04B 7/088* (2013.01);
(Continued)

(58) Field of Classification Search
CPC ............ H04W 24/10; H04W 72/1231; H04W 72/082; H04W 72/042; H04W 92/20;
(Continued)

(56) References Cited

U.S. PATENT DOCUMENTS

2013/0231125 A1* 9/2013 Jeon .................... H04W 72/082
455/452.1
2015/0103934 A1* 4/2015 Nam .................... H04B 7/0413
375/260
(Continued)

FOREIGN PATENT DOCUMENTS

CN  103199906 A  7/2013
CN  104184504 A  12/2014
(Continued)

OTHER PUBLICATIONS

IEEE Std 802.11ad™—2012, Part 11: Wireless LAN Medium Access Control (MAC) and Physical Layer (PHY) Specifications Amendment 3: Enhancements for Very High Throughput in the 60 GHz Band. Dec. 28, 2012, 634 pages.

*Primary Examiner* — Hashim S Bhatti
(74) *Attorney, Agent, or Firm* — Womble Bond Dickinson (US) LLP

(57) ABSTRACT

Embodiments of the present invention provide a method which includes: sending a first channel quality measurement report, wherein the first channel quality measurement report indicates a channel noise value measured in a first time period by a first station in a second antenna mode when a third station and a fourth station communicate with each other in a first antenna mode; and receiving an grant frame sent by the AP based on the first channel quality measurement report, wherein the grant frame carries first instruction information and/or second instruction information. A success rate of space-shared communication between station pairs can be increased.

20 Claims, 6 Drawing Sheets

Related U.S. Application Data continuation of application No. PCT/CN2016/109479, filed on Dec. 12, 2016.

(51) Int. Cl.

| | |
|---|---|
| *H04B 7/06* | (2006.01) |
| *H04W 72/12* | (2009.01) |
| *H04B 17/345* | (2015.01) |
| *H04W 72/04* | (2009.01) |
| *H04W 72/08* | (2009.01) |
| *H04W 92/20* | (2009.01) |
| *H04W 24/02* | (2009.01) |

(52) U.S. Cl.
CPC ........ *H04B 17/345* (2015.01); *H04W 72/042* (2013.01); *H04W 72/082* (2013.01); *H04W 72/1231* (2013.01); *H04W 92/20* (2013.01); *H04W 24/02* (2013.01)

(58) Field of Classification Search
CPC ..... H04W 24/02; H04B 7/088; H04B 7/0695; H04B 7/061; H04B 17/345
See application file for complete search history.

(56) References Cited

U.S. PATENT DOCUMENTS

2016/0112970 A1* 4/2016 Chen .................... H04B 7/0617 455/522
2018/0294850 A1* 10/2018 Frenger ................ H04B 7/0413

FOREIGN PATENT DOCUMENTS

| CN | 104247511 A | 12/2014 |
|---|---|---|
| WO | 2013085468 A1 | 6/2013 |

\* cited by examiner

300

S310

Receive a first channel quality measurement report sent by a first station and a second channel quality measurement report sent by a second station, where the first channel quality measurement report indicates a channel noise value measured in a first time period by the first station in a second antenna mode when a third station and a fourth station communicate with each other in a first antenna mode, and the second channel quality measurement report indicates a channel noise value received in the first time period by the second station in the second antenna mode when the third station and the fourth station communicate with each other in the first antenna mode

S320

Send an authorization frame if the channel noise value measured by at least one of the first station and the second station in the second antenna mode is greater than a first threshold, where the authorization frame carries first instruction information, and the first instruction information is used to instruct to change the first antenna mode to an antenna mode other than the first antenna mode and/or to change the second antenna mode to an antenna mode other than the second antenna mode

S410
A first station sends a first channel quality measurement report to an access point AP, where the first channel quality measurement report indicates a channel noise value measured in a first time period by the first station in a second antenna mode when a third station and a fourth station communicate with each other in a first antenna mode S420
The first station receives an authorization frame sent by the AP based on the first channel quality measurement report, where the authorization frame carries first instruction information and/or second instruction information, the first instruction information is used to instruct the first station and the second station to measure channel noise values in an antenna mode other than the second antenna mode, and the second instruction information is used to instruct the first station and the second station to communicate with each other in an antenna mode other than the second antenna mode, so that the third station and the fourth station measure channel noise values

FIG. 4

COMMUNICATION METHOD, ACCESS POINT, AND STATION

CROSS-REFERENCE TO RELATED APPLICATIONS

This application is a continuation of U.S. patent application Ser. No. 16/039,083, filed on Jul. 18, 2018, which is a continuation of International Application No. PCT/CN2016/109479, filed on Dec. 12, 2016, which claims priority to Chinese Patent Application No. 2016/10042129.8, filed on Jan. 22, 2016. All of the aforementioned patent applications are hereby incorporated by reference in their entireties.

TECHNICAL FIELD

Embodiments of the present invention relate to the communications field, and more specifically, to a communication method, an access point, and a station.

BACKGROUND

The Institute of Electrical and Electronics Engineers (IEEE) 802.11ad is a technology protocol specifying wireless local area network (WLAN) devices working on the 60 GHz frequency band, including a personal basic service set (PBSS) control point (PCP)/access point (AP) and a directional gigabit station (STA). Due to a characteristic of the 60 GHz frequency band, a signal is subject to relatively serious loss and fading in the air. In a directional transmission system, when two STAs communicate with each other, a sender interferes with another STA in system space. Therefore, a plurality of STA pairs cannot communicate simultaneously on a same frequency band to implement space-shared communication.

In a mechanism of the existing IEEE 802.11ad protocol, in space, each station pair needs to first perform beamforming training to find a transmit antenna angle and/or a receive antenna angle suitable for both. This means only one fixed antenna mode is supported for communication between two stations. During space sharing measurement, an access point sequentially sends channel quality measurement requests to a plurality of stations. As long as one of the plurality of STAs refuses to perform channel quality measurement or a channel noise value in a channel quality measurement report reported by one STA after channel measurement exceeds a threshold, the plurality of STAs cannot perform space-shared communication.

However, in a next-generation protocol, if a multiple-input multiple-output (MIMO) technology is supported, which means a plurality of antenna modes are supported between two stations, only one antenna mode can be tried each time to perform space sharing measurement if the existing space sharing method is used, resulting in a relatively low success rate of space-shared communication between station pairs.

SUMMARY

Embodiments of the present invention provide a communication method, to improve a success rate of space-shared communication between station pairs in one space sharing request process.

According to a first aspect, a communication method is provided. The method includes: receiving a first channel quality measurement report sent by a first station and a second channel quality measurement report sent by a second station, where the first channel quality measurement report indicates a channel noise value measured in a first time period by the first station in a second antenna mode when a third station and a fourth station communicate with each other in a first antenna mode, and the second channel quality measurement report indicates a channel noise value measured in the first time period by the second station in the second antenna mode when the third station and the fourth station communicate with each other in the first antenna mode; and sending an grant frame if the channel noise value measured by at least one of the first station and the second station in the second antenna mode is greater than a first threshold, where the grant frame carries first instruction information, and the first instruction information is used to instruct to change the first antenna mode to an antenna mode other than the first antenna mode and/or to change the second antenna mode to an antenna mode other than the second antenna mode.

According to the communication method provided in this embodiment of the present invention, the channel noise value measured in the first time period by the first station in the second antenna mode when the third station and the fourth station communicate with each other in the first antenna mode and the channel noise value measured in the first time period by the second station in the second antenna mode when the third station and the fourth station communicate with each other in the first antenna mode, are received; and the grant frame is sent if the channel noise value measured by at least one of the first station and the second station in the second antenna mode is greater than the first threshold, where the grant frame carries the first instruction information, and the first instruction information is used to instruct to change the first antenna mode to an antenna mode other than the first antenna mode and/or to change the second antenna mode to an antenna mode other than the second antenna mode. In this way, a success rate of space-shared communication between station pairs can be increased.

In one embodiment, the first instruction information is further used to indicate a second time period, and the method further includes: receiving a third channel quality measurement report sent by the first station and a fourth channel quality measurement report sent by the second station, where the third channel quality measurement report indicates a channel noise value measured in the second time period by the first station in a current antenna mode when the third station and the fourth station communicate with each other in the current antenna mode, and the fourth channel quality measurement report indicates a channel noise value measured in the second time period by the second station in the current antenna mode when the third station and the fourth station communicate with each other in the current antenna mode; and sending second instruction information if the channel noise values measured by the first station and the second station in the current antenna mode are both less than or equal to the first threshold, where the second instruction information is used to indicate a third time period for the first station and the second station to communicate with each other and a fourth time period for the third station and the fourth station to communicate with each other, and the third time period completely or partially overlaps the fourth time period, so that the first station, the second station, the third station, and the fourth station perform space-shared communication.

In one embodiment, before the receiving a first channel quality measurement report sent by a first station and a second station, the method further includes: sending third instruction information to the first station and the second station among a plurality of stations, where the third instruction information is used to instruct the first station and the second station to measure channel noise values in the first time period; and sending fourth instruction information to the third station and the fourth station among the plurality of stations, where the fourth instruction information is used to instruct the third station and the fourth station to communicate with each other in the first time period.

In one embodiment, before the sending third instruction information to the first station and the second station among a plurality of stations, the method further includes: sending an antenna mode information request to each of the plurality of stations, where the antenna mode information request is used to request a quantity of antenna modes determined by the first station and the second station among the plurality of stations through beamforming training, and a quantity of antenna modes determined by the third station and the fourth station among the plurality of stations through beamforming training.

In one embodiment, the third instruction information is carried in a channel quality measurement request frame, and the channel quality measurement request frame is used to request to perform space sharing measurement; and after the sending third instruction information to the first station and the second station among a plurality of stations, the method further includes: receiving channel quality measurement acknowledgement frames sent by the first station and the second station.

According to the communication method provided in this embodiment of the present invention, if a channel noise value in a channel quality measurement report measured by at least one station in two station pairs exceeds a threshold, an antenna mode used by the at least one of the two station pairs is directly changed and channel quality measurement is performed again, with no need to send another channel quality measurement request frame and receive a channel quality measurement acknowledgement frame sent by each station. This reduces signaling overheads of communication between a station and an access point, and reduces a time required for a space sharing measurement process.

According to a second aspect, a commutation method is provided, including: sending, by a first station, a first channel quality measurement report to an access point (AP), where the first channel quality measurement report indicates a channel noise value measured in a first time period by the first station in a second antenna mode when a third station and a fourth station communicate with each other in a first antenna mode; and receiving, by the first station, an grant frame sent by the AP based on the first channel quality measurement report, where the grant frame carries first instruction information and/or second instruction information, the first instruction information is used to instruct the first station and the second station to measure channel noise values in an antenna mode other than the second antenna mode, and the second instruction information is used to instruct the first station and the second station to communicate with each other in an antenna mode other than the second antenna mode, so that the third station and the fourth station measure channel noise values.

According to the communication method provided in this embodiment of the present invention, the first station sends the first channel quality measurement report to the AP, where the first channel quality measurement report indicates the channel noise value measured in the first time period by the first station in the second antenna mode when the third station and the fourth station communicate with each other in the first antenna mode; and the first station receives the grant frame sent by the AP based on the first channel quality measurement report, where the grant frame carries the first instruction information, and the first instruction information is used to instruct to change the second antenna mode to the antenna mode other than the second antenna mode. In this way, a success rate of space-shared communication between station pairs can be increased.

In one embodiment, the grant frame further carries third instruction information used to indicate a second time period, and the method further includes: measuring, by the first station based on the third instruction information, a channel noise value in the second time period in a third antenna mode when the third station and the fourth station communicate with each other in the first antenna mode; and sending, by the first station, a second channel quality measurement report to the AP, where the second channel quality measurement report is used to indicate the channel noise value measured in the second time period in the third antenna mode when the third station and the fourth station communicate with each other in the first antenna mode.

In one embodiment, after the sending a second channel quality measurement report to the AP, the method further includes: receiving, by the first station, fourth instruction information sent by the AP based on the second channel quality measurement report, where the fourth instruction information is used to instruct the first station and the second station to communicate with each other in a third time period and the third station and the fourth station to communicate with each other in a fourth time period, and the third time period completely or partially overlaps the fourth time period; and performing, by the first station, space-shared communication with the second station, the third station, and the fourth station based on the fourth instruction information.

In one embodiment, before the sending, by a first station, a first channel quality measurement report to an access point AP, the method further includes: receiving, by the first station, an antenna mode information request sent by the AP, where the antenna mode information request is used to request a quantity of antenna modes determined by the first station and the second station through beamforming training.

According to a third aspect, an access point is provided, configured to perform the method according to any one of the first aspect or the possible implementations of the first aspect. Specifically, the access point includes units configured to perform the method according to any one of the first aspect or the possible implementations of the first aspect.

According to a fourth aspect, a station is provided, configured to perform the method according to any one of the second aspect or the possible implementations of the second aspect. Specifically, the station includes units configured to perform the method according to any one of the second aspect or the possible implementations of the second aspect.

According to a fifth aspect, an access point is provided, and the access point includes a receiver, a transmitter, a memory, a processor, and a bus system. The receiver, the transmitter, the memory, and the processor are connected by the bus system; the memory is configured to store an instruction; the processor is configured to: execute the instruction stored in the memory, and control the transmitter to send a signal; and when the processor executes the instruction stored in the memory, the execution causes the processor to perform the method according to any one of the first aspect or the possible implementations of the first aspect.

According to a sixth aspect, a station is provided, and the station includes a receiver, a transmitter, a memory, a processor, and a bus system. The receiver, the transmitter, the memory, and the processor are connected by the bus system; the memory is configured to store an instruction; the processor is configured to: execute the instruction stored in the memory, and control the transmitter to send a signal; and when the processor executes the instruction stored in the memory, the execution causes the processor to perform the method according to any one of the second aspect or the possible implementations of the second aspect.

According to a seventh aspect, a computer readable medium is provided, configured to store a computer program, where the computer program includes an instruction used to perform the method according to any one of the first aspect or the possible implementations of the first aspect.

According to an eighth aspect, a computer readable medium is provided, configured to store a computer program, where the computer program includes an instruction used to perform the method according to any one of the second aspect or the possible implementations of the second aspect.

BRIEF DESCRIPTION OF DRAWINGS

FIG. 3 is a schematic flowchart of another communication method according to an embodiment of the present invention;

FIG. 4 is a schematic flowchart of another communication method according to an embodiment of the present invention;

DESCRIPTION OF EMBODIMENTS

The following describes the embodiments of the present invention with reference to the accompanying drawings in the embodiments of the present invention.

An access point (AP, Access Point), also referred to as a wireless access point, a bridge, a hot spot, or the like, may access a server or a communications network. Optionally, the AP provided in the embodiments of the present invention may be a device supporting the 802.11ad standard, and is backward compatible.

A station may be a wireless sensor, a wireless communications terminal, or a mobile terminal, for example, a mobile phone (or referred to as a "cellular" phone) supporting a WiFi communication function or a computer having a wireless communication function.

Figure 1:
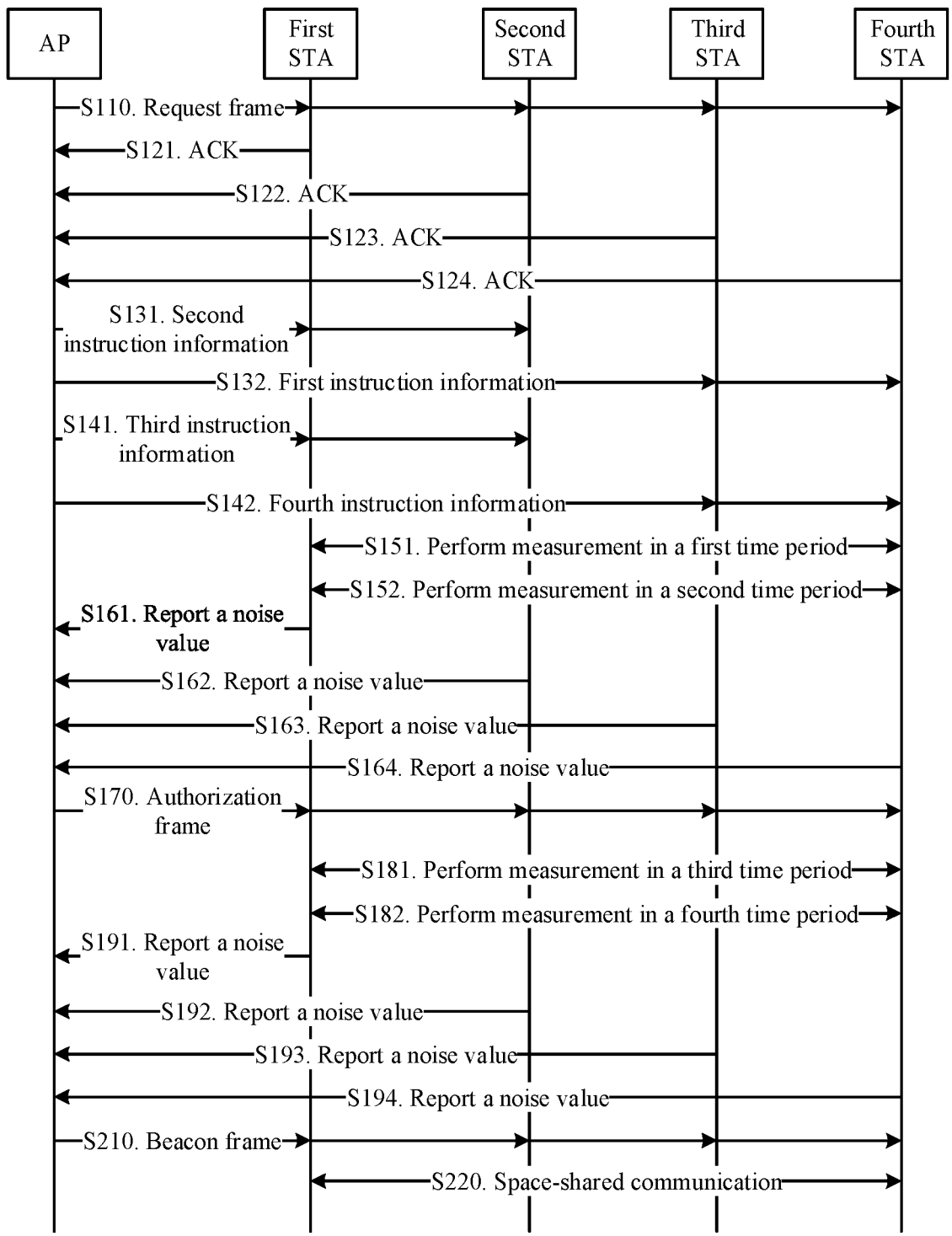
FIG. 1 is a schematic flowchart of a communication method according to an embodiment of the present invention.

FIG. 1 shows a communication method 100 according to an embodiment of the present invention. The method 100 describes a schematic procedure of space-shared communication.

Operation S110. An access point sends a channel quality measurement request frame to a first station, a second station, a third station, and a fourth station.

Figure 2:
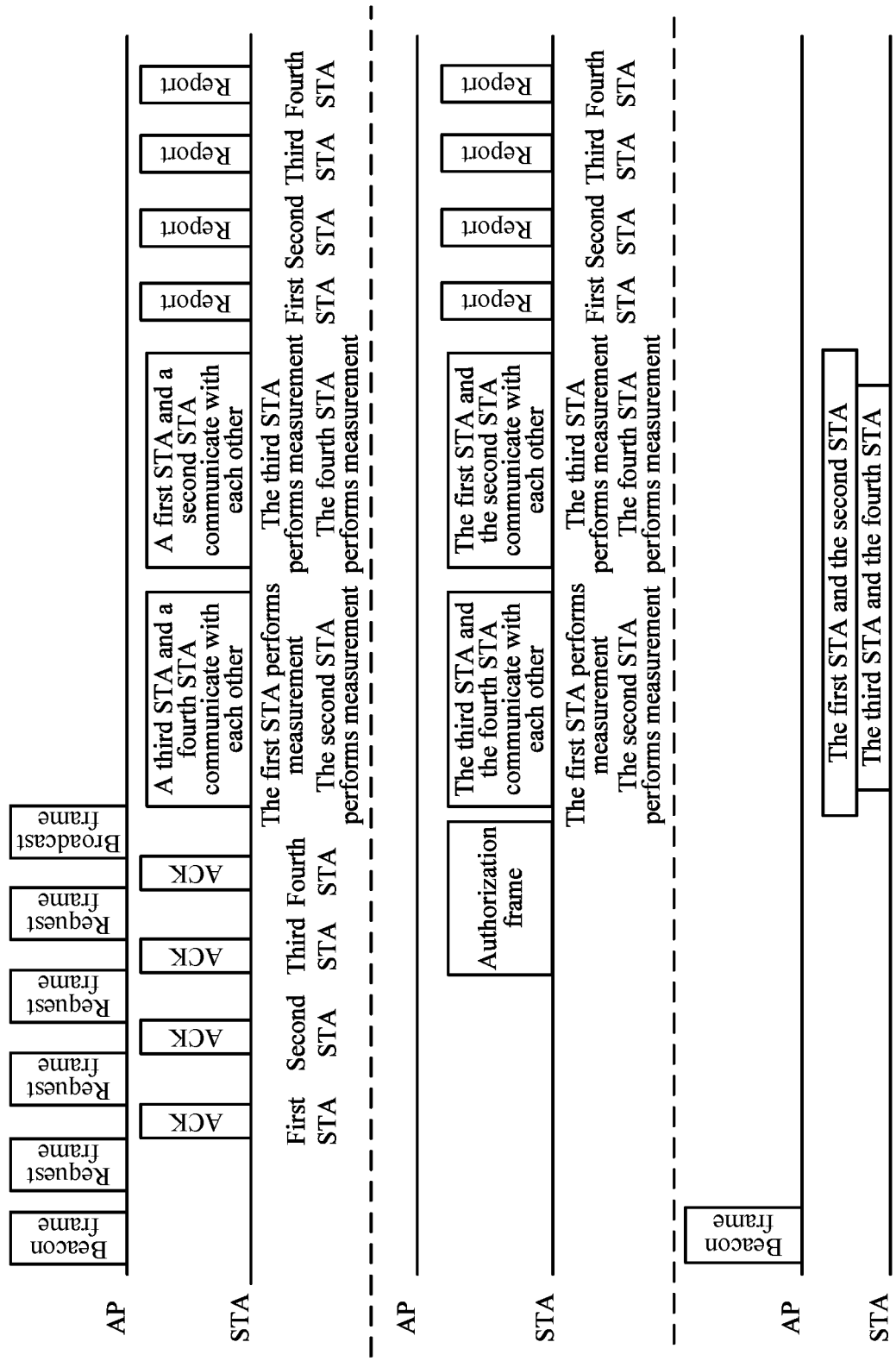
FIG. 2 is a schematic flowchart of another communication method according to an embodiment of the present invention.

Specifically, as shown in FIG. 2, the access point may send the channel quality measurement request frame to the first station, the second station, the third station, and the fourth station among a plurality of stations. The channel quality measurement request frame is used to request the first station, the second station, the third station, and the fourth station to perform space sharing measurement.

In one embodiment, the access point may sequentially send the channel quality measurement request frame to the first station, the second station, the third station, and the fourth station, or may simultaneously send the channel quality measurement request frame to the first station, the second station, the third station, and the fourth station. This is not limited in this embodiment of the present invention.

It should be understood that, before operation S110, the first station and the second station among the plurality of stations may obtain M appropriate antenna modes through beamforming training, and the third station and the fourth station may obtain N appropriate antenna modes through beamforming training, where an antenna mode used between the first station and the second station may be the same as or different from an antenna mode used between the third station and the fourth station, $M \geq 1$, $N \geq 1$, and M and N are not both 1.

It should also be understood that every two stations that have performed beamforming training may store antenna modes obtained through beamforming training in respective memories of the stations, and also store an identifier of each antenna mode; or may store sequence numbers of antenna modes obtained through beamforming training and a mapping relationship between each sequence number and a corresponding antenna mode in respective memories of the stations. An identifier of an antenna mode may be a sequence number of the antenna mode. This is not limited in this embodiment of the present invention.

In one embodiment, it is assumed that the first station includes a transmit antenna $a_1$, a transmit antenna $b_1$, a receive antenna $c_1$, and a receive antenna $d_1$, and that the second station includes a transmit antenna $a_2$, a transmit antenna $b_2$, a receive antenna $c_2$, and a receive antenna $d_2$. A first antenna mode is obtained through beamforming training. In the first antenna mode, when the first station sends a signal by using the second sector of the transmit antenna $a_1$, the second station receives the signal by using the third sector of the receive antenna $d_2$; and when the second station sends a signal by using the second sector of the transmit antenna $a_2$, the first station receives the signal by using the first sector of the transmit antenna $b_1$. Once an antenna mode between two stations has been determined, configuration information of a transmit antenna and a receive antenna used when the two stations communicate with each other can be determined. Optionally, an antenna mode between two stations may alternatively include a mode in which a plurality of transmit/receive antennas are used for signal transmission. However, this embodiment of the present invention is not limited thereto.

In one embodiment, the channel quality measurement request frame is further used to request a quantity of antenna modes determined by the first station and the second station among the plurality of stations through beamforming training, and the channel quality measurement request frame sent to the third station and the channel quality measurement request frame are further used to request a quantity of antenna modes determined by the third station and the fourth station through beamforming training.

Operation S121. The first station sends an acknowledgement (Acknowledgement, ACK) frame to the access point.

Operation S122. The second station sends an ACK frame to the access point.

Operation S123. The third station sends an ACK frame to the access point.

Operation S124. The fourth station sends an ACK frame to the access point.

Specifically, as shown in FIG. 2, after receiving the channel quality measurement request frame sent by the access point, the first station, the second station, the third station, and the fourth station may send the ACK frames to the access point. The ACK frames are used to indicate an agreement to space sharing measurement.

In one embodiment, the first station, the second station, the third station, and the fourth station may sequentially send the ACK frames to the access point when each station has received the channel quality measurement request frame, or may simultaneously send the ACK frames to the access point when all the stations have received the channel quality measurement request frame. This is not limited in this embodiment of the present invention.

In one embodiment, the first station and the second station may add, into the ACK frames sent to the access point, the quantity of antenna modes determined through beamforming training, and the third station and the fourth station may also add, into the ACK frames sent to the access point, the quantity of antenna modes determined through beamforming training.

It should be understood that the access point receives a quantity of antenna modes between every two stations, to manage and control selection and change of an antenna mode between stations in subsequent scheduling. However, this embodiment of the present invention is not limited thereto.

It should also be understood that two stations that have performed beamforming training can pre-store a mapping table of antenna modes for communication with each other, and in a mapping table stored by each station, sequence numbers in ascending order may correspond to antenna modes with communication performance in descending order. When the access point performs scheduling, the stations may sequentially use the antenna modes in the mapping table that are corresponding to sequence numbers in ascending order. To be specific, each station pair preferentially uses an antenna mode with best communication performance to perform communication, expecting to obtain, through channel quality measurement, an antenna mode having best comprehensive communication quality and performance for station pairs, so as to finally implement space-shared communication between two station pairs. However, this embodiment of the present invention is not limited thereto.

Operation S131. The access point sends first instruction information to the third station and the fourth station among a plurality of stations, where the first instruction information is used to instruct the third station and the fourth station to communicate with each other in a first time period.

Specifically, the access point may add, in operation S110, the first instruction information into the channel quality measurement request frame sent to the third station and the fourth station. The first instruction information is used to instruct the third station and the fourth station to communicate with each other in the first time period.

Operation S132. The access point sends second instruction information to the first station and the second station among the plurality of stations, where the second instruction information is used to instruct the first station and the second station to communicate with each other in a second time period.

Specifically, the access point may add, in operation S110, the second instruction information into the channel quality measurement request frame sent to the first station and the second station. The second instruction information is used to instruct the first station and the second station to communicate with each other in the second time period.

Operation S141. The access point sends third instruction information to the first station and the second station among the plurality of stations, where the third instruction information is used to instruct the first station and the second station to measure channel noise values in the first time period.

Operation S142. The access point sends fourth instruction information to the third station and the fourth station among the plurality of stations, where the fourth instruction information is used to instruct the third station and the fourth station to measure channel noise values in the second time period.

Optionally, the access point may add the third instruction information and the fourth instruction information into a broadcast frame, send the third instruction information and the fourth instruction information to all stations in a broadcast manner, or send the third instruction information and the fourth instruction information in a multicast manner to each station pair that has performed beamforming training. However, this embodiment of the present invention is not limited thereto.

Operation S151. In the first time period, the third station and the fourth station communicate with each other, and the first station and the second station measure respective channel noise values.

Specifically, as shown in FIG. 2, in the first time period allocated by the access point, the third station and the fourth station communicate with each other in a first antenna mode; at the same time, the first station and the second station set antennas to the first antenna mode, but do not perform communication; and the first station measures, by using a receive antenna, the channel noise value existing in a channel in this time, and the second station measures, by using a receive antenna, the channel noise value existing in a channel in this time.

In one embodiment, during the first time period, the third station and the fourth station configure transmit and receive antennas based on the first antenna mode. The first time period may be divided into two equal time segments. In the early half period of time, a transmit antenna of the third station may send a signal, and a receive antenna of the fourth station may receive the signal sent by the third station. In the later half period of time, the fourth station may send a signal, and a receive antenna of the third station may receive the signal sent by the fourth station. At the same time, when the third station sends the signal, the first station and the second station measure respective channel noise values in channels for subsequent channel quality measurement. However, this embodiment of the present invention is not limited thereto.

In one embodiment, a broadcast frame may be used to carry time segment information of the first time period, such as a start time and duration of each time segment, and the broadcast frame may be further used to carry an identifier of a transmit station and an identifier of a receive station that are in each time segment. This is not limited in this embodiment of the present invention.

Operation S152. In the second time period, the first station and the second station communicate with each other, and the third station and the fourth station measure respective channel noise values.

This process is similar to operation S151. To avoid repetition, details are not described herein again.

Operation S161. The first station reports a measured channel noise value.

Operation S162. The second station reports a measured channel noise value.

Operation S163. The third station reports a measured channel noise value.

Operation S164. The fourth station reports a measured channel noise value.

Specifically, as shown in FIG. 2, the first station, the second station, the third station, and the fourth station may sequentially report the channel noise values measured in each time period, or may simultaneously report the channel noise values measured in each time period. This is not limited in this embodiment of the present invention.

In one embodiment, if the channel noise values reported by the first station, the second station, the third station, and the fourth station are all less than or equal to a first threshold, it indicates that, when the first station and the second station communicate with each other, the third station and the fourth station may perform space-shared communication on a same frequency band.

Operation S170. If the channel noise value received by the access point and measured by at least one of the first station, the second station, the third station, and the fourth station is greater than the first threshold, the access point sends an grant frame to the first station, the second station, the third station, and the fourth station.

It should be understood that if the channel noise value measured by at least one of the first station, the second station, the third station, and the fourth station is greater than the first threshold, it indicates that, when the third station and the fourth station communicate with each other in a current antenna mode, interference of a sender of the third station and the fourth station to communication between the first station and the second station in a current antenna mode is excessively large, or it indicates that, when the first station and the second station communicate with each other in a current antenna mode, interference of a sender of the first station and the second station to communication between the third station and the fourth station in a current antenna mode is excessively large. Therefore, space multiplexing cannot be implemented for the first station, the second station, the third station, and the fourth station in a same time period on a same frequency band to implement space-shared communication.

Specifically, as shown in FIG. 2, the grant frame carries fifth instruction information, a third time period, and a fourth time period. The fifth instruction information is used to instruct to change the first antenna mode and/or a second communication mode. The third time period is used for the first station and the second station to perform channel quality measurement and for the third station and the fourth station to communicate with each other. The fourth time period is used for the third station and the fourth station to perform channel quality measurement and for the first station and the second station to communicate with each other.

In one embodiment, it is assumed that before operation S170, the first station and the second station use the first antenna mode, and the third station and the fourth station use the second antenna mode. The access point may instruct to change the first antenna mode to a third antenna mode, may instruct to change the second antenna mode to a fourth antenna mode, or may instruct to change the second antenna mode to a fourth antenna mode and change the first antenna mode to a third antenna mode. The first antenna mode may be the same as the second antenna mode, and the third antenna mode may be the same as the fourth antenna mode. This is not limited in this embodiment of the present invention.

Operation S181. The third station and the fourth station communicate with each other in a third time period in the current antenna mode, and at the same time, the first station and the second station measure respective channel noise values.

Operation S182. The first station and the second station communicate with each other in a fourth time period in the current antenna mode, and at the same time, the third station and the fourth station measure respective channel noise values.

Specifically, as shown in FIG. 2, in the third time period and the fourth time period, channel quality measurement is performed. A specific process is similar to operation S151 and operation S152. To avoid repetition, details are not described herein again.

Operation S191 to operation S194. The first station, the second station, the third station, and the fourth station report measured channel noise values.

Specifically, as shown in FIG. 2, a process of reporting measurement reports is similar to operation S161 to operation S164. To avoid repetition, details are not described herein again.

Operation S210. If the channel noise values received by the access point and reported by the first station, the second station, the third station, and the fourth station are all less than or equal to the first threshold, the access point sends sixth instruction information to the first station and the second station, and sends seventh instruction information to the third station and the fourth station. The fifth time period is used to instruct the first station and the second station to communicate with each other in a fifth time period, and the seventh instruction information is used to instruct the third station and the fourth station to communicate with each other in a sixth time period.

Optionally, the sixth instruction information and the seventh instruction information may be added into a beacon frame and sent to the first station, the second station, the third station, and the fourth station in a broadcast manner. This is not limited in this embodiment of the present invention.

Specifically, if the channel noise values reported by the first station, the second station, the third station, and the fourth station to the access point are all less than or equal to the first threshold, it indicates that, when the first station and the second station communicate with each other, the third station and the fourth station may perform space-shared communication on a same frequency band.

Operation S220. The first station and the second station communicate with each other in the fifth time period in the current antenna mode, while the third station and the fourth station communicate with each other in the sixth time period in the current antenna mode, to implement space-shared communication.

According to the communication method provided in this embodiment of the present invention, the channel noise value measured in the first time period by the first station in the second antenna mode when the third station and the fourth station communicate with each other in the first antenna mode and the channel noise value measured in the first time period by the second station in the second antenna mode when the third station and the fourth station communicate with each other in the first antenna mode, are received; and the grant frame is sent if the channel noise value measured by at least one of the first station and the second station in the second antenna mode is greater than the first threshold, where the grant frame carries the first instruction information, and the first instruction information is used to instruct to change the first antenna mode to an antenna mode other than the first antenna mode and/or to change the second antenna mode to an antenna mode other than the second antenna mode.

According to the communication method provided in this embodiment of the present invention, if a channel noise value measured by a station does not meet a threshold requirement, the access point does not need to send a channel quality measurement request frame again, and the stations do not need to reply to the request frame. This reduces signaling overheads of communication between the station and the access point, and reduces a measurement time required for implementing space-shared communication between station pairs.

FIG. 3 shows a communication method 300 according to an embodiment of the present invention. As shown in FIG. 3, the method 300 may be performed by an AP.

Operation S310. Receive a first channel quality measurement report sent by a first station and a second channel quality measurement report sent by a second station, where the first channel quality measurement report indicates a channel noise value measured in a first time period by the first station in a second antenna mode when a third station and a fourth station communicate with each other in a first antenna mode, and the second channel quality measurement report indicates a channel noise value measured in the first time period by the second station in the second antenna mode when the third station and the fourth station communicate with each other in the first antenna mode.

In one embodiment, the access point may receive the first channel quality measurement report sent by the first station, and the first channel quality measurement report indicates the channel noise value measured in the first time period by the first station in the second antenna mode when the third station and the fourth station communicate with each other in the first antenna mode; and the access point may further receive the second channel quality measurement report sent by the second station, and the second channel quality measurement report indicates the channel noise value received in the first time period by the second station in the second antenna mode when the third station and the fourth station communicate with each other in the first antenna mode.

It should be understood that the third station and the fourth station are two stations different from the first station and the second station, among a plurality of stations.

Operation S320. Send an grant frame if the channel noise value measured by at least one of the first station and the second station in the second antenna mode is greater than a first threshold, where the grant frame carries first instruction information, and the first instruction information is used to instruct to change the first antenna mode to an antenna mode other than the first antenna mode and/or to change the second antenna mode to an antenna mode other than the second antenna mode.

It should be understood that if the channel noise value measured by at least one of the first station and the second station in the second antenna mode is greater than the first threshold, it indicates that interference is excessively large when the first station, the second station, the third station, and the fourth station perform communication simultaneously in a same time period on a same frequency band, so that space-shared communication is not possible. Therefore, it is necessary to change an antenna mode of at least one station pair and perform space sharing measurement again.

In one embodiment, if the channel noise value measured by at least one of the first station and the second station in the second antenna mode is greater than the first threshold, the access point may send the grant frame to the first station, the second station, the third station, and the fourth station. The grant frame carries the first instruction information, and the first instruction information is used to instruct the first station and the second station to change the first antenna mode to an antenna mode other than the first antenna mode and/or instruct the third station and the fourth station to change the second antenna mode to an antenna mode other than the second antenna mode.

In one embodiment, the grant frame further carries a second time period for the first station, the second station, the third station, and the fourth station to perform space sharing measurement again. After S320, the access point may receive a third channel quality measurement report sent by the first station and a fourth channel quality measurement report sent by the second station. The third channel quality measurement report indicates a channel noise value measured in the second time period by the first station in a current antenna mode when the third station and the fourth station communicate with each other in a current antenna mode, and the fourth channel quality measurement report indicates a channel noise value measured in the second time period by the second station in the current antenna mode when the third station and the fourth station communicate with each other in the current antenna mode.

In one embodiment, if the channel noise values received by the access point and measured by the first station and the second station in the current antenna mode are both less than or equal to the first threshold, the access point may send second instruction information to the first station, the second station, the third station, and the fourth station. The second instruction information is used to indicate a third time period for the first station and the second station to communicate with each other and a fourth time period for the third station and the fourth station to communicate with each other, and the third time period completely or partially overlaps the fourth time period, so that the first station, the second station, the third station, and the fourth station perform space-shared communication.

It should be understood that if the channel noise values received by the access point and measured by the first station and the second station in the current antenna mode are both less than or equal to the first threshold, it indicates that the first station, the second station, the third station, and the fourth station may simultaneously perform communication in a same time period on a same frequency band.

In one embodiment, the access point may add the second instruction information into a beacon frame and send the second instruction information to the first station, the second station, the third station, and the fourth station in a broadcast manner, or may send the second instruction information in a multicast manner separately to the first station and the second station and to the third station and the fourth station. This is not limited in this embodiment of the present invention.

In one embodiment, before operation S310, the access point may send third instruction information to the first station and the second station among a plurality of stations, and the third instruction information is used to instruct the first station and the second station to measure channel noise values in the first time period. Alternatively, the access point may send fourth instruction information to the third station and the fourth station among the plurality of stations, and the fourth instruction information is used to instruct the third station and the fourth station to communicate with each other in the first time period.

Optionally, the access point may send, to the first station and the second station, a channel quality measurement request frame for requesting to perform space sharing measurement and add the third instruction information into the channel quality measurement request frame sent to the first station and the second station. The access point may simultaneously send the channel quality measurement request frame to the first station and the second station, or may sequentially send the channel quality measurement request frame to the first station and the second station. This is not limited in this embodiment of the present invention.

In one embodiment, the access point may add the fourth instruction information into a broadcast frame sent to the third station and the fourth station, or may send the fourth instruction information to the third station and the fourth station information in a multicast manner. This is not limited in this embodiment of the present invention.

It should be understood that the foregoing space sharing measurement procedure is on the basis that the access point knows in advance that the first station and the second station can communicate with each other in a plurality of antenna modes and that the third station and the fourth station can communicate with each other in a plurality of antenna modes.

Optionally, if the access point does not know, before space sharing measurement, a quantity of antenna modes supported between the first station and the second station and a quantity of antenna modes supported between the third station and the fourth station, the channel quality measurement request frame sent by the access point to the first station and the second station may be further used to request the quantity of antenna modes obtained by the first station and the second station through beamforming training.

According to the communication method provided in this embodiment of the present invention, a success rate of space-shared communication between station pairs can be increased. If a channel noise value measured by a station does not meet a threshold requirement, the access point does not need to send a channel quality measurement request frame again, and the stations do not need to reply to the request frame. This reduces signaling overheads of communication between the station and the access point, and reduces a measurement time required for implementing space-shared communication between station pairs.

FIG. 4 shows a communication method 400 according to an embodiment of the present invention. As shown in FIG. 4, the method 400 may be performed by a station STA.

Operation S410. A first station sends a first channel quality measurement report to an access point AP, where the first channel quality measurement report indicates a channel noise value measured in a first time period by the first station in a second antenna mode when a third station and a fourth station communicate with each other in a first antenna mode.

In one embodiment, the first station may send the first channel quality measurement report to the AP, and the first channel quality measurement report is used to report, to the AP, the channel noise value measured in the first time period by the first station in the second antenna mode when the third station and the fourth station communicate with each other in the first antenna mode.

It should be understood that when the first station measures the channel noise value, the first station configures antennas in the first antenna mode obtained through beamforming training with the second station, to measure, in the first antenna mode, impact on the first station existing when another station sends a signal.

Operation S420. The first station receives an grant frame sent by the AP based on the first channel quality measurement report, where the grant frame carries first instruction information and/or second instruction information, the first instruction information is used to instruct the first station and the second station to measure channel noise values in an antenna mode other than the second antenna mode, and the second instruction information is used to instruct the first station and the second station to communicate with each other in an antenna mode other than the second antenna mode, so that the third station and the fourth station measure channel noise values.

In one embodiment, the first station may receive the grant frame sent by the AP based on the first channel quality measurement report. The grant frame may carry the first instruction information, and the first instruction information is used to instruct to change the first antenna mode in which the first station and the second station measure the channel noise values. The grant frame may further carry the second instruction information, and the second instruction information is used to instruct to change the second antenna mode in which the first station and the second station communicate with each other, so that the third station and the fourth station measure the channel noise values.

In one embodiment, the grant frame may be sent to the first station and the second station in a broadcast manner, or may be sent to the first station and the second station in a multicast manner. This is not limited in this embodiment of the present invention.

In one embodiment, the grant frame may further carry third instruction information, and the third instruction information is used to indicate a second time period. The first station may measure a channel noise value in the second time period in a third antenna mode based on the third instruction information when the third station and the fourth station communicate with each other in the first antenna mode. Then the first station may send a second channel quality measurement report to the AP, and the second channel quality measurement report is used to indicate the channel noise value measured in the second time period in the third antenna mode when the third station and the fourth station communicate with each other in the first antenna mode.

In one embodiment, the first station may receive fourth instruction information sent by the AP based on the second channel quality measurement report. The fourth instruction information is used to instruct the first station and the second station to communicate with each other in a third time period and the third station and the fourth station to communicate with each other in a fourth time period, and the third time period completely or partially overlaps the fourth time period. The first station performs space-shared communication with the second station, the third station, and the fourth station based on the fourth instruction information.

In one embodiment, before operation S410, the first station may receive a channel quality measurement request frame sent by the AP, and the channel quality measurement request frame is used to request the first station, the second station, the third station, and the fourth station to perform space sharing measurement. If the first station, the second station, the third station, and the fourth station agree to perform space sharing measurement, the first station, the second station, the third station, and the fourth station reply with ACK frames after receiving the channel quality measurement request frame.

In one embodiment, the channel quality measurement request frame is further used to request a quantity of antenna modes determined by the first station and the second station through beamforming training. After receiving the channel quality measurement request frame, the first station may add, into an ACK frame sent to the AP, the quantity of antenna modes determined by the first station and the second station through beamforming training.

According to the communication method provided in this embodiment of the present invention, a success rate of space-shared communication between station pairs can be increased. If a channel noise value measured by a station does not meet a threshold requirement, an antenna mode for measurement and/or an antenna mode for communication are/is directly changed based on the instruction sent by the access point, and channel quality measurement is continued. This reduces signaling overheads of communication between the station and the access point, and reduces a measurement time required for implementing space-shared communication between station pairs.

Figure 5:
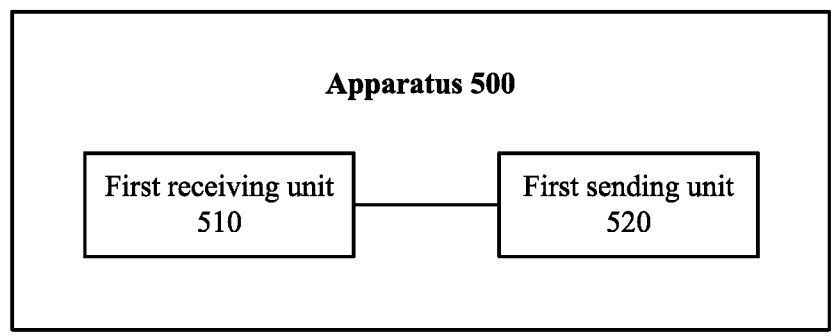
FIG. 5 is a schematic block diagram of a communications apparatus according to an embodiment of the present invention.

FIG. 5 shows an apparatus 500 according to an embodiment of the present invention. The apparatus 500 may be, for example, an access point.

A first receiving unit 510 is configured to receive a first channel quality measurement report sent by a first station and a second channel quality measurement report sent by a second station, where the first channel quality measurement report indicates a channel noise value measured in a first time period by the first station in a second antenna mode when a third station and a fourth station communicate with each other in a first antenna mode, and the second channel quality measurement report indicates a channel noise value measured in the first time period by the second station in the second antenna mode when the third station and the fourth station communicate with each other in the first antenna mode.

A first sending unit 520 is configured to send an grant frame if the channel noise value measured by at least one of the first station and the second station in the second antenna mode is greater than a first threshold, where the grant frame carries first instruction information, and the first instruction information is used to instruct to change the first antenna mode to an antenna mode other than the first antenna mode and/or to change the second antenna mode to an antenna mode other than the second antenna mode.

In one embodiment, the first instruction information is further used to indicate a second time period, and the first receiving unit 510 is further configured to receive a third channel quality measurement report sent by the first station and a fourth channel quality measurement report sent by the second station. The third channel quality measurement report indicates a channel noise value measured in the second time period by the first station in a current antenna mode when the third station and the fourth station communicate with each other in a current antenna mode, and the fourth channel quality measurement report indicates a channel noise value measured in the second time period by the second station in the current antenna mode when the third station and the fourth station communicate with each other in the current antenna mode. The first sending unit 520 is further configured to send second instruction information if the channel noise values measured by the first station and the second station in the current antenna mode are both less than or equal to the first threshold. The second instruction information is used to indicate a third time period for the first station and the second station to communicate with each other and a fourth time period for the third station and the fourth station to communicate with each other, and the third time period completely or partially overlaps the fourth time period, so that the first station, the second station, the third station, and the fourth station perform space-shared communication.

In one embodiment, the access point further includes a second sending unit. The second sending unit is specifically configured to: send third instruction information to the first station and the second station among a plurality of stations before the first channel quality measurement report sent by the first station and the second station is received, where the third instruction information is used to instruct the first station and the second station to measure channel noise values in the first time period; and send fourth instruction information to the third station and the fourth station among the plurality of stations, where the fourth instruction information is used to instruct the third station and the fourth station to communicate with each other in the first time period.

In one embodiment, the third instruction information may be added into a channel quality measurement request frame, and the channel quality measurement request frame is used to request to perform space sharing measurement.

In one embodiment, the channel quality measurement request frame is further used to request a quantity of antenna modes determined by the first station and the second station through beamforming training. The access point further includes a second receiving unit, and the second receiving unit is specifically configured to receive channel quality measurement acknowledgement frames sent by the first station and the second station. The channel quality measurement acknowledgement frame carries the quantity of antenna modes determined by the first station and the second station through beamforming training.

According to the access point provided in this embodiment of the present invention, the first receiving unit receives the channel noise value measured in the first time period by the first station in the second antenna mode when the third station and the fourth station communicate with each other in the first antenna mode and the channel noise value measured in the first time period by the second station in the second antenna mode when the third station and the fourth station communicate with each other in the first antenna mode. The first sending unit sends the grant frame if the channel noise value received by at least one of the first station and the second station in the second antenna mode is greater than the first threshold, where the grant frame carries the first instruction information, and the first instruction information is used to instruct to change the first antenna mode to an antenna mode other than the first antenna mode and/or to change the second antenna mode to an antenna mode other than the second antenna mode. In this way, a success rate of space-shared communication between station pairs can be increased.

According to the access point provided in this embodiment of the present invention, if a received channel noise value measured by a station does not meet a threshold requirement, the access point does not need to send the channel quality measurement request frame again, but directly instructs the station to change an antenna mode and continues channel quality measurement. This reduces signaling overheads of communication between the station and the access point, and reduces a measurement time required for implementing space-shared communication between station pairs.

Figure 6:
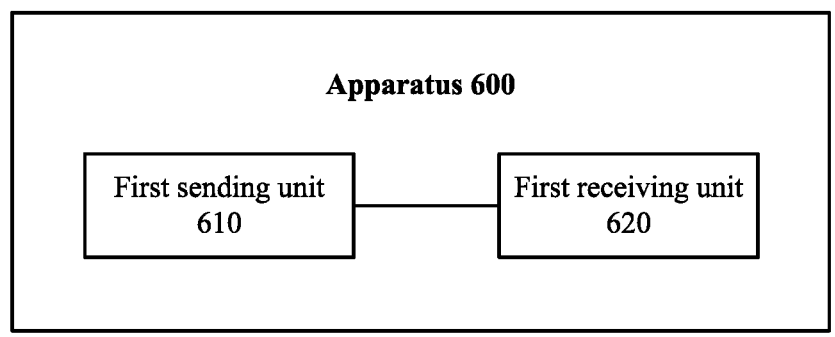
FIG. 6 is a schematic block diagram of another communications apparatus according to an embodiment of the present invention.

FIG. 6 shows an apparatus 600 according to an embodiment of the present invention. The apparatus 600 may be, for example, a station.

A first sending unit 610 is configured to send a first channel quality measurement report to an access point AP, where the first channel quality measurement report indicates a channel noise value measured in a first time period by the apparatus 600 in a second antenna mode when a third station and a fourth station communicate with each other in a first antenna mode.

A first receiving unit 620 is configured to receive an grant frame sent by the AP based on the first channel quality measurement report sent by the first sending unit 610, where the grant frame carries first instruction information and/or second instruction information, the first instruction information is used to instruct the apparatus 600 and a second station to measure channel noise values in an antenna mode other than the second antenna mode, and the second instruction information is used to instruct the apparatus 600 and the second station to communicate with each other in an antenna mode other than the second antenna mode, so that the third station and the fourth station measure channel noise values.

In one embodiment, the grant frame further carries third instruction information used to indicate a second time period. The station further includes a measurement unit, and the measurement unit is specifically configured to measure, in the second time period based on the third instruction information, a channel noise value in a third antenna mode when the third station and the fourth station communicate with each other in the first antenna mode. The first sending unit is specifically configured to send a second channel quality measurement report to the AP, and the second channel quality measurement report is used to indicate the channel noise value measured in the second time period in the third antenna mode when the third station and the fourth station communicate with each other in the first antenna mode.

In one embodiment, after the second channel quality measurement report is sent to the AP, the first receiving unit 620 is further configured to receive fourth instruction information sent by the AP based on the second channel quality measurement report. The fourth instruction information is used to instruct the first station and the second station to communicate with each other in a third time period and the third station and the fourth station to communicate with each other in a fourth time period, and the third time period completely or partially overlaps the fourth time period. The station further includes a communications unit, and the communications unit is specifically configured to perform space-shared communication with the second station, the third station, and the fourth station based on the fourth instruction information.

In one embodiment, the station further includes a second receiving unit and a second sending unit. The second receiving unit is specifically configured to: before the first channel quality measurement report is sent to the access point AP, receive a channel quality measurement request frame sent by the AP, where the channel quality measurement request frame is used to request a quantity of antenna modes determined by the first station and the second station through beamforming training. The second sending unit is specifically configured to send a channel quality measurement acknowledgement frame to the AP after the channel quality measurement request frame sent by the AP is received, where the channel quality measurement acknowledgement frame carries the quantity of antenna modes determined by the first station and the second station through beamforming training.

According to the station provided in this embodiment of the present invention, the channel noise value measured in the first time period by the first station in the second antenna mode when the third station and the fourth station communicate with each other in the first antenna mode and the channel noise value measured in the first time period by the second station in the second antenna mode when the third station and the fourth station communicate with each other in the first antenna mode, are received; and the grant frame is sent if the channel noise value measured by at least one of the first station and the second station in the second antenna mode is greater than the first threshold, where the grant frame carries the first instruction information, and the first instruction information is used to instruct to change the first antenna mode to an antenna mode other than the first antenna mode and/or to change the second antenna mode to an antenna mode other than the second antenna mode. In this way, a success rate of space-shared communication between station pairs can be increased.

According to the station provided in this embodiment of the present invention, if the channel noise value measured by the station does not meet a threshold requirement, an antenna mode for measurement and/or an antenna mode for communication are/is directly changed based on the instruction sent by the access point, and channel quality measurement is continued. This reduces signaling overheads of communication with access point, and reduces a measurement time required for implementing space-shared communication between station pairs.

Figure 7:
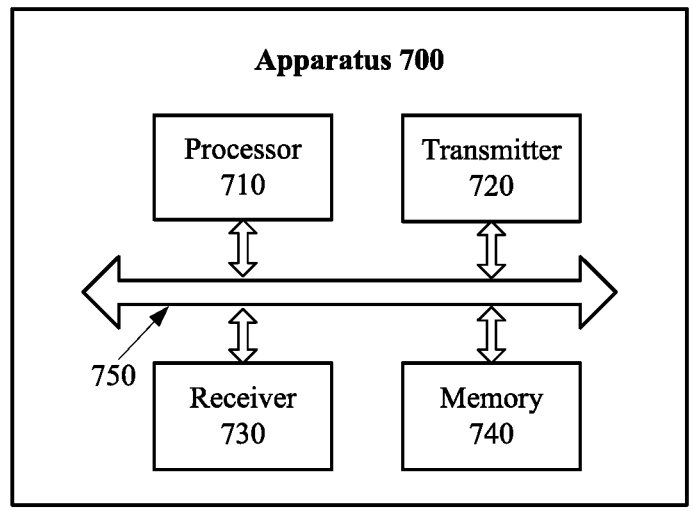
FIG. 7 is a schematic block diagram of still another communications apparatus according to an embodiment of the present invention.

FIG. 7 shows an apparatus 700 according to an embodiment of the present invention. The apparatus 700 includes a processor 710, a transmitter 720, a receiver 730, a memory 740, and a bus system 750. The processor 710, the transmitter 720, the receiver 730, and the memory 740 are connected by the bus system 750. The memory 740 is configured to store an instruction, and the processor 710 is configured to execute the instruction stored in the memory 740, to control the transmitter 720 to send a signal. The transmitter 720 and the receiver 730 may be communication interfaces. Specifically, the transmitter 720 may be an interface configured to receive data and/or an instruction, and the receiver 730 may be an interface configured to send data and/or an instruction. Specific forms of the transmitter 720 and the receiver 730 are not described using examples herein.

It should be understood that the apparatus 700 may be an access point, and may be configured to perform the corresponding steps and/or procedures in the foregoing method embodiments. Optionally, the memory 740 may include a read-only memory and a random access memory, and provide an instruction and data to the processor. A part of the memory may further include a non-volatile random access memory. For example, the memory may further store device type information. The processor 710 may be configured to execute the instruction stored in the memory. When the processor executes the instruction, the processor may perform the steps corresponding to an access point that are in the foregoing method embodiments.

Figure 8:
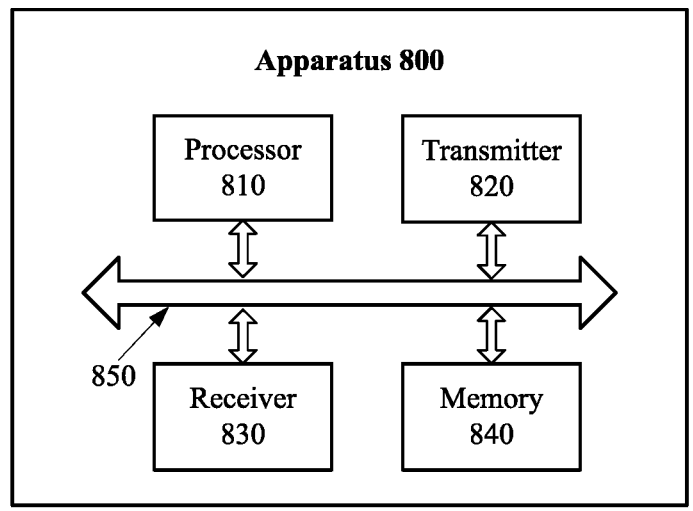
FIG. 8 is a schematic block diagram of still another communications apparatus according to an embodiment of the present invention.

FIG. 8 shows an apparatus 800 according to an embodiment of the present invention. The apparatus 800 includes a processor 810, a transmitter 820, a receiver 830, a memory 840, and a bus system 850. The processor 810, the transmitter 820, the receiver 830, and the memory 840 are connected by the bus system 850. The memory 840 is configured to store an instruction, and the processor 810 is configured to execute the instruction stored in the memory 840, to control the transmitter 820 to send a signal. The transmitter 820 and the receiver 830 may be communication interfaces. Specifically, the transmitter 820 may be an interface configured to receive data and/or an instruction, and the receiver 830 may be an interface configured to send data and/or an instruction. Specific forms of the transmitter 820 and the receiver 830 are not described using examples herein.

It should be understood that the apparatus 800 may be a station, and may be configured to perform the corresponding steps and/or procedures in the foregoing method embodiments. Optionally, the memory 840 may include a read-only memory and a random access memory, and provide an instruction and data to the processor. A part of the memory may further include a non-volatile random access memory. For example, the memory may further store device type information. The processor 810 may be configured to execute the instruction stored in the memory. When the processor executes the instruction, the processor may perform the steps corresponding to a station that are in the foregoing method embodiments.

It should be understood that in this embodiment of the present invention, the processor may be a central processing unit (Central Processing Unit, CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

In an implementation process, steps in the foregoing methods may be completed by using a hardware integrated logic circuit in the processor, or by using instructions in a form of software. The steps of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor executes an instruction in the memory and completes the steps in the foregoing methods in combination with the hardware in the processor. To avoid repetition, details are not described herein again.

A person of ordinary skill in the art may be aware that the method steps and units described with reference to the embodiments disclosed in this specification may be implemented by electronic hardware, computer software, or a combination thereof. To clearly describe the interchangeability between hardware and software, the foregoing has generally described the steps and compositions of the embodiments based on functions. Whether the functions are implemented by hardware or software depends on particular applications and design constraint conditions of the technical solutions. A person of ordinary skill in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses, or units, or may be electrical connections, mechanical connections, or connections in other forms.

The units described as separate parts may or may not be physically separate. Parts displayed as units may or may not be physical units, and may be located in one position or distributed on a plurality of network units. Some or all of the units may be selected based on actual needs to achieve the objectives of the solutions of the embodiments of the present invention.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific embodiments of this application, but are not intended to limit the protection scope of this application. Any modification or replacement readily figured out by a person skilled in the art within the technical scope disclosed in the present invention shall fall within the protection scope of this application. Therefore, the protection scope of this application shall be subject to the protection scope of the claims.

What is claimed is:

1. A wireless apparatus, comprising:
a processor; and
a non-transitory computer readable storage medium storing programming for execution by the processor, the programming, when executed by the processor, instructs the wireless apparatus to:
receive a first channel quality measurement report from a first station and a second channel quality measurement report from a second station, wherein the first channel quality measurement report indicates a first channel noise value measured during a first time period by the first station in a second antenna mode when a third station and a fourth station communicate with each other in a first antenna mode, and wherein the second channel quality measurement report indicates a second channel noise value measured during the first time period by the second station in the second antenna mode when the third station and the fourth station communicate with each other in the first antenna mode; and
send a grant frame if at least one of the first and second channel noise values received by the first receiving unit and measured by at least one of the first station and the second station in the second antenna mode is greater than a first threshold, wherein the grant frame includes first instruction information used to instruct to change the first antenna mode to an antenna mode other than the first antenna mode and/or to change the second antenna mode to an antenna mode other than the second antenna mode.

2. The wireless apparatus according to claim 1, wherein the first instruction information is further used to indicate a second time period, and the programming, when executed by the processor, further instructs the wireless apparatus to
receive a third channel quality measurement report from the first station and a fourth channel quality measurement report from the second station, wherein
the third channel quality measurement report indicates a third channel noise value measured during the second time period by the first station in a current antenna mode when the third station and the fourth station communicate with each other in the current antenna mode, and the fourth channel quality measurement report indicates a fourth channel noise value measured during the second time period by the second station in the current antenna mode when the third station and the fourth station communicate with each other in the current antenna mode; and
send second instruction information if the third and fourth channel noise values measured by the first station and the second station respectively in the current antenna mode are both less than or equal to the first threshold, wherein the second instruction information is used to indicate a third time period for the first station and the second station to communicate with each other and a fourth time period for the third station and the fourth station to communicate with each other, and the third time period completely or partially overlaps the fourth time period, so that the first station, the second station, the third station, and the fourth station perform space-shared communication.

3. The wireless apparatus according to claim 2, wherein the programming, when executed by the processor, instructs the wireless apparatus to:
send third instruction information to the first station and the second station among a plurality of stations before the first channel quality measurement report sent by the first station and the second station is received, wherein the third instruction information is used to instruct the first station and the second station to measure channel noise values during the first time period; and
send fourth instruction information to the third station and the fourth station among the plurality of stations, wherein the fourth instruction information is used to instruct the third station and the fourth station to communicate with each other during the first time period.

4. The wireless apparatus according to claim 3, wherein the third instruction information is carried in a channel quality measurement request frame, and the channel quality measurement request frame is used to request to perform space sharing measurement.

5. The wireless apparatus according to claim 4, wherein the channel quality measurement request frame is further used to request a quantity of antenna modes determined by the first station and the second station among the plurality of stations through beamforming training; and
the programming, when executed by the processor, instructs the wireless apparatus to:
receive channel quality measurement acknowledgement frames from the first station and the second station, wherein each of the channel quality measurement acknowledgement frames includes the quantity of antenna modes determined by the first station and the second station respectively through beamforming training.

6. The wireless apparatus according to claim 2, wherein the grant frame carries fifth instruction information, a third time period, and a fourth time period, wherein the fifth instruction information is used to instruct to change the first antenna mode and/or a second communication mode; the third time period is used for the first station and the second station to perform channel quality measurement and for the third station and the fourth station to communicate with each other; the fourth time period is used for the third station and the fourth station to perform channel quality measurement and for the first station and the second station to communicate with each other.

7. The wireless apparatus according to claim 2, wherein the programming, when executed by the processor, instructs the wireless apparatus to:
send sixth instruction information to the first station and the second station, and send seventh instruction information to the third station and the fourth station if channel noise values reported by the first station, the second station, the third station, and the fourth station are all less than or equal to the first threshold, wherein the sixth instruction information is used to instruct the first station and the second station to communicate with each other in a fifth time period, and the seventh instruction information is used to instruct the third station and the fourth station to communicate with each other in a sixth time period.

8. A wireless apparatus, comprising:
a processor; and
a non-transitory computer readable storage medium storing programming for execution by the processor, the programming, when executed by the processor, instructs the wireless apparatus to:
send a first channel quality measurement report to an access point (AP), wherein the first channel quality measurement report indicates a channel noise value measured during a first time period by the wireless apparatus in a second antenna mode when a third station and a fourth station communicate with each other in a first antenna mode; and
receive an grant frame from the AP in response to the first channel quality measurement report,
wherein the grant frame includes first instruction information and/or second instruction information, the first instruction information is used to instruct the wireless apparatus and the second station to measure channel noise values in an antenna mode other than the second antenna mode, and the second instruction information is used to instruct the wireless apparatus and the second station to communicate with each other in an antenna mode other than the second antenna mode, so that the third station and the fourth station measure channel noise values.

9. The wireless apparatus according to claim 8, wherein the grant frame further includes third instruction information used to indicate a second time period, and
the programming, when executed by the processor, instructs the wireless apparatus to:
measure, based on the third instruction information, a channel noise value during the second time period in a third antenna mode when the third station and the fourth station communicate with each other in the first antenna mode; and
send a second channel quality measurement report to the AP, wherein the second channel quality measurement report is used to indicate the channel noise value measured during the second time period in the third antenna mode when the third station and the fourth station communicate with each other in the first antenna mode.

10. The wireless apparatus according to claim 9, wherein the third instruction information is carried in a channel quality measurement request frame, and the channel quality measurement request frame is used to request to perform space sharing measurement.

11. The wireless apparatus according to claim 9, wherein the programming, when executed by the processor, instructs the wireless apparatus to:
after the second channel quality measurement report is sent to the AP, receive fourth instruction information from the AP in response to the second channel quality measurement report, wherein the fourth instruction information is used to instruct a first station and the second station to communicate with each other during a third time period and the third station and the fourth station to communicate with each other during a fourth time period, and the third time period completely or partially overlaps with the fourth time period; and
perform space-shared communication with the second station, the third station, and the fourth station based on the fourth instruction information.

12. The wireless apparatus according to claim 9, wherein the programming, when executed by the processor, instructs the wireless apparatus to:
receive a channel quality measurement request frame from the AP, wherein the channel quality measurement request frame is used to request a quantity of antenna modes determined by the wireless apparatus and the second station through beamforming training; and
send a channel quality measurement acknowledgement frame to the AP after the channel quality measurement request frame is received from the AP, wherein the channel quality measurement acknowledgement frame includes the quantity of antenna modes determined by the wireless apparatus and the second station through beamforming training.

13. The wireless apparatus according to claim 9, wherein the grant frame carries fifth instruction information, a third time period, and a fourth time period, wherein the fifth instruction information is used to instruct to change the first antenna mode and/or a second communication mode; the third time period is used for the wireless apparatus and the second station to perform channel quality measurement and for the third station and the fourth station to communicate with each other; the fourth time period is used for the third station and the fourth station to perform channel quality measurement and for the wireless apparatus and the second station to communicate with each other.

14. The wireless apparatus according to claim 9, wherein the programming, when executed by the processor, instructs the wireless apparatus to:
receive sixth instruction information from the access point, wherein the sixth instruction information is used to instruct the wireless apparatus and the second station to communicate with each other in a fifth time period.

15. A non-transitory computer-readable storage medium storing a program an instruction for execution by a processor of an access device, the program instruction; when executed by the processor of the access device, causing the access device to:
receive a first channel quality measurement report from a first station and a second channel quality measurement report from a second station, wherein the first channel quality measurement report indicates a first channel noise value measured during a first time period by the first station in a second antenna mode when a third station and a fourth station communicate with each other in a first antenna mode, and wherein the second channel quality measurement report indicates a second channel noise value measured during the first time period by the second station in the second antenna mode when the third station and the fourth station communicate with each other in the first antenna mode; and
send a grant frame if at least one of the first and second channel noise values received by the first receiving unit and measured by at least one of the first station and the second station in the second antenna mode is greater than a first threshold, wherein the grant frame includes first instruction information used to instruct to change the first antenna mode to an antenna mode other than the first antenna mode and/or to change the second antenna mode to an antenna mode other than the second antenna mode.

16. The non-transitory computer-readable storage medium according to claim 15, wherein the first instruction information is further used to indicate a second time period, and the program instruction, when executed by the processor of the access device, causing the access device to:
receive a third channel quality measurement report from the first station and a fourth channel quality measurement report from the second station, wherein
the third channel quality measurement report indicates a third channel noise value measured during the second time period by the first station in a current antenna mode when the third station and the fourth station communicate with each other in the current antenna mode, and the fourth channel quality measurement report indicates a fourth channel noise value measured during the second time period by the second station in the current antenna mode when the third station and the fourth station communicate with each other in the current antenna mode; and send second instruction information if the third and fourth channel noise values measured by the first station and the second station respectively in the current antenna mode are both less than or equal to the first threshold, wherein the second instruction information is used to indicate a third time period for the first station and the second station to communicate with each other and a fourth time period for the third station and the fourth station to communicate with each other, and the third time period completely or partially overlaps the fourth time period, so that the first station, the second station, the third station, and the fourth station perform space-shared communication.

17. The non-transitory computer-readable storage medium according to claim 16, wherein the program instruction, when executed by the processor of the access device, causing the access device to:

send third instruction information to the first station and the second station among a plurality of stations before the first channel quality measurement report sent by the first station and the second station is received, wherein the third instruction information is used to instruct the first station and the second station to measure channel noise values during the first time period; and send fourth instruction information to the third station and the fourth station among the plurality of stations, wherein the fourth instruction information is used to instruct the third station and the fourth station to communicate with each other during the first time period.

18. The non-transitory computer-readable storage medium according to claim 17, wherein the third instruction information is carried in a channel quality measurement request frame, and the channel quality measurement request frame is used to request to perform space sharing measurement.

19. The non-transitory computer-readable storage medium according to claim 18, wherein the channel quality measurement request frame is further used to request a quantity of antenna modes determined by the first station and the second station among the plurality of stations through beamforming training; and wherein the program instruction, when executed by the processor of the access device, causing the access device to:

receive channel quality measurement acknowledgement frames from the first station and the second station, wherein each of the channel quality measurement acknowledgement frames includes the quantity of antenna modes determined by the first station and the second station respectively through beamforming training.

20. The non-transitory computer-readable storage medium according to claim 16, wherein the grant frame carries fifth instruction information, a third time period, and a fourth time period, wherein the fifth instruction information is used to instruct to change the first antenna mode and/or a second communication mode; the third time period is used for the first station and the second station to perform channel quality measurement and for the third station and the fourth station to communicate with each other; the fourth time period is used for the third station and the fourth station to perform channel quality measurement and for the first station and the second station to communicate with each other.

* * * * *